United States Patent
Fang et al.

(10) Patent No.: US 12,526,863 B2
(45) Date of Patent: Jan. 13, 2026

(54) MULTI-LINK DEVICE AND TECHNIQUES FOR ENHANCED WIRELESS COMMUNICATION CAPABILITIES

(71) Applicant: T-MOBILE INNOVATIONS LLC, Overland Park, KS (US)

(72) Inventors: Zheng Fang, McLean, VA (US); Zheng Cai, Fairfax, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 365 days.

(21) Appl. No.: 18/179,208

(22) Filed: Mar. 6, 2023

(65) Prior Publication Data
US 2024/0306233 A1    Sep. 12, 2024

(51) Int. Cl.
*H04L 12/28* (2006.01)
*H04W 72/1263* (2023.01)
*H04W 76/15* (2018.01)
*H04W 84/12* (2009.01)

(52) U.S. Cl.
CPC ......... *H04W 76/15* (2018.02); *H04L 12/2854* (2013.01); *H04W 72/1263* (2013.01); *H04W 84/12* (2013.01)

(58) Field of Classification Search
CPC . H04W 76/15; H04W 72/1263; H04W 84/12; H04L 12/2854
See application file for complete search history.

(56) References Cited

U.S. PATENT DOCUMENTS

| 10,841,732 | B2 | 11/2020 | Cavendish et al. | |
| 2008/0240100 | A1* | 10/2008 | Smith | H04L 12/4641 370/392 |
| 2010/0309839 | A1* | 12/2010 | Goldshtein | H04B 7/18591 370/316 |
| 2012/0134261 | A1* | 5/2012 | Natarajan | H04B 7/1856 370/225 |
| 2014/0098796 | A1* | 4/2014 | Xue | H04W 48/18 370/336 |
| 2015/0334034 | A1* | 11/2015 | Smedley | H04L 49/111 709/219 |

(Continued)

FOREIGN PATENT DOCUMENTS

CN    113453233 A    9/2021

*Primary Examiner* — Andrew Lee
(74) *Attorney, Agent, or Firm* — SHOOK, HARDY & BACON L.L.P.

(57) ABSTRACT

The technology disclosed herein relates to a multi-link device and methods, media, and systems associated with the multi-link device. The multi-link device can establish multiple wide area network (WAN) connections with multiple base stations. The multi-link device has multiple sets of antennas, and each WAN connection is associated with at least one of the multiple sets of antennas. The multi-link device also has a local area network (LAN) interface that is capable of establishing a plurality of LAN connections. The multi-link device can determine which of the WAN connections has a highest uplink bandwidth or a lowest uplink bandwidth. In some embodiments, the multi-link device ranks each of the WAN connections based on uplink bandwidth. Further, the multi-link device can transmit various sets of data (e.g., video data, image data, audio data, location data) to the multiple base stations via the WAN connections that are concurrently active.

15 Claims, 5 Drawing Sheets

(56) References Cited

U.S. PATENT DOCUMENTS

| | | | |
|---|---|---|---|
| 2019/0196844 A1* | 6/2019 | Hirai | G06F 9/445 |
| 2019/0222539 A1* | 7/2019 | Gittleman | H04L 49/70 |
| 2019/0268973 A1* | 8/2019 | Bull | H04W 92/02 |
| 2022/0210819 A1* | 6/2022 | Sevindik | H04W 72/1263 |
| 2023/0116879 A1* | 4/2023 | Tran Le | H04W 28/0247 |
| | | | 370/235 |
| 2024/0196302 A1* | 6/2024 | Bertolus | H04W 40/005 |

* cited by examiner

MULTI-LINK DEVICE AND TECHNIQUES FOR ENHANCED WIRELESS COMMUNICATION CAPABILITIES

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. The present disclosure is directed, in part, to technology associated with a multi-link device and techniques for enhanced wireless communication capabilities, substantially as shown in and/or described in connection with at least one of the figures, and as set forth more completely in the claims.

In aspects set forth herein, and at a high level, the technology described herein relates to facilitating communications via concurrently active wide area network (WAN) connections between the multi-link device and one or more base stations for improved transmissions of uplink signals. For example, the multi-link device may comprise a local area network (LAN) interface capable of establishing a plurality of LAN connections with or more user devices, computer memory capable of storing computer-usable instructions, one or more processors, and a set of antennas for each of the WAN connections. In embodiments, the plurality of LAN connections include different types of LAN connections. The multi-link device can establish one or more of the concurrently active WAN connections with one or more cells of one or more base stations. For example, the multi-link device can establish the WAN connections based on transmitting quality of service requests.

The multi-link device can map each of the LAN connections to one or more of the WAN connections. For example, the mapping can be based on virtual LAN (VLAN) tagging (e.g., based on the type of LAN connection and a particular location). Continuing the example, each VLAN tag can be used by the multi-link device to transmit incoming packets to a particular base station based on a bandwidth and quality of service provided by the particular base station, for example. In some embodiments, the multi-link device transmits data (e.g., audio data, image data, video data, location data) received from user devices located within a predetermined range from a cell edge of a base station. Further, in some embodiments, one or more user devices subsequently receive the data transmitted via an uplink from the multi-link device to recreate one or more events captured in real-time by a plurality of other user devices located within a threshold range from one another, the plurality of user devices being at a different location than the one or more user devices that subsequently recreate the one or more events.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
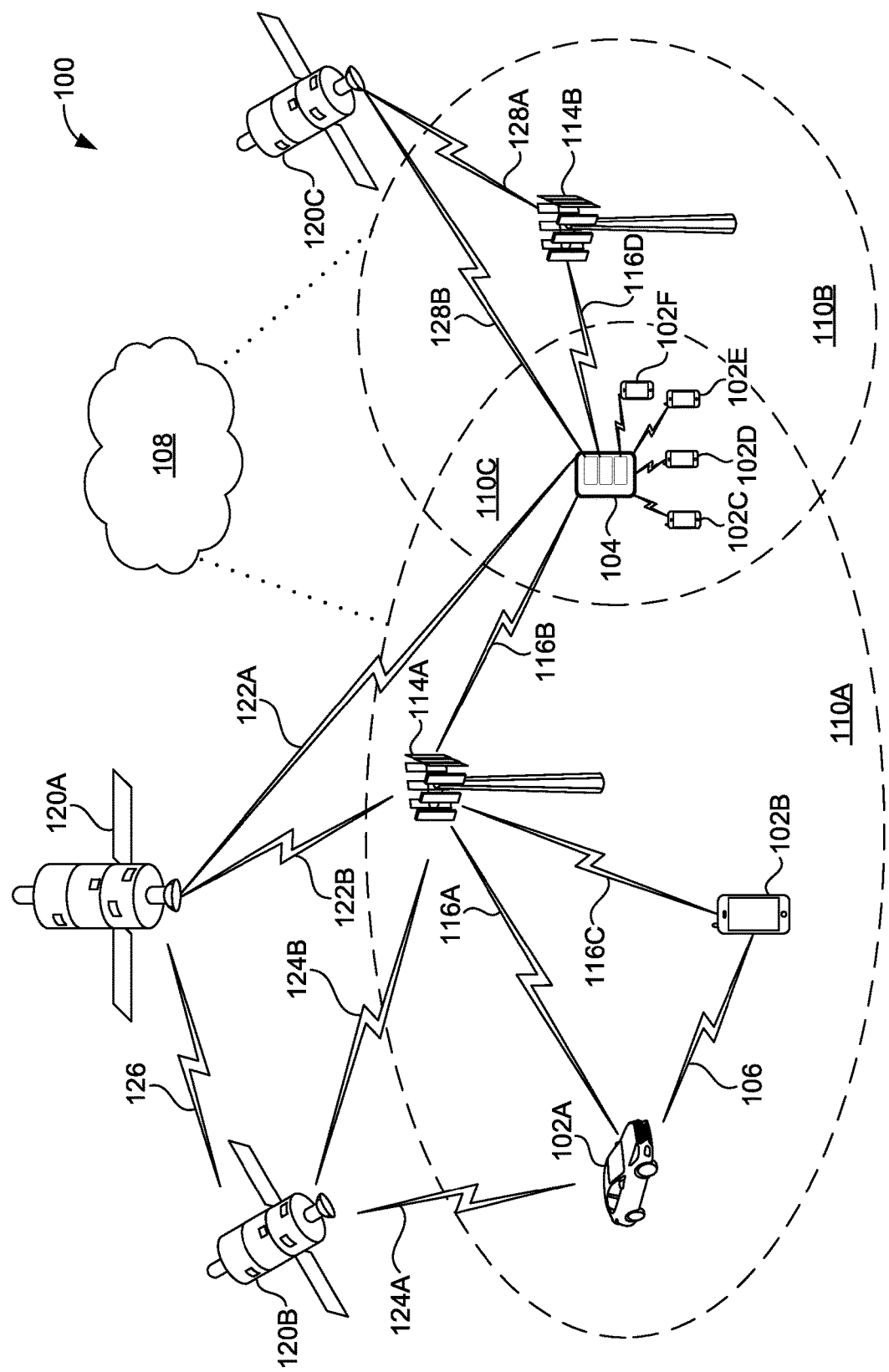
FIG. 1 depicts an example operating environment for the multi-link device in a wireless telecommunication network, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Cellular Communication System
4G Fourth-Generation Cellular Communication System
5G Fifth-Generation Cellular Communication System
CD-ROM Compact Disk Read Only Memory
CDMA Code Division Multiple Access
eNB Evolved Node B
FDD Frequency Division Duplex
gNB Next Generation Node B
GPRS General Packet Radio Service
GSM Global System for Mobile communications
DVD Digital Versatile Discs
EEPROM Electrically Erasable Programmable Read Only Memory
E-UTRA Evolved Universal Terrestrial Radio Access
FD-MIMO Full-Dimension Multiple-Input Multiple-Output
GPS Global Positioning System
HSS Home Subscriber Server
IoT Internet of Things
LAN Local Area Network
LTE Long Term Evolution
MIMO Multiple-Input Multiple-Output
MME Mobility Management Entity
mmWave Millimeter waves
MU-MIMO Multi-User Multiple-Input Multiple-Output
NR New Radio
PC Personal Computer
PDA Personal Digital Assistant PDCCH Physical Downlink Control Channel
PDSCH Physical Downlink Shared Channel
PUCCH Physical Uplink Control Channel
PUSCH Physical Uplink Shared Channel
RAM Random Access Memory
RF Radio-Frequency
ROM Read Only Memory
RRC Radio Resource Control
RSRP Reference Signal Received Power
RSRQ Reference Signal Received Quality
RSSI Received Signal Strength Indicator
SINR Signal-to-Interference and Noise Ratio
SNR Signal-to-Noise Ratio
SRS Sounding Reference Signal
TDMA Time Division Multiple Access
VLAN Virtual Local Area Network
WAN Wide Area Network In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Further, the term "some" may refer to "one or more." Additionally, an element in the singular may refer to "one or more."

The term "combination" (e.g., a combination thereof, combinations thereof) may refer to, for example, "at least one of A, B, or C"; "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

Additionally, a "user device," as used herein, is a device that has the capability of using a wireless communications network, and may also be referred to as a "computing device," "mobile device," "user equipment," "wireless communication device," or "UE." A user device, in some aspects, may take on a variety of forms, such as a PC, a laptop computer, a tablet, a mobile phone, a PDA, a server, or any other device that is capable of communicating with other devices (e.g., by transmitting or receiving a signal) using a wireless communication. A user device may be, in an embodiment, similar to user devices 102A and 102B described herein with respect to FIG. 1. A user device may also be, in another embodiment, similar to user device 500, described herein with respect to FIG. 5.

A user device may additionally include internet-of-things devices, such as one or more of the following: a sensor, controller (e.g., a lighting controller, a thermostat), appliances (e.g., a smart refrigerator, a smart air conditioner, a smart alarm system), other internet-of-things devices, or one or more combinations thereof. Internet-of-things devices may be stationary, mobile, or both. In some aspects, the user device is associated with a vehicle (e.g., a video system in a car capable of receiving media content stored by a media device in a house when coupled to the media device via a local area network). In some aspects, the user device comprises a medical device, a location monitor, a clock, other wireless communication devices, or one or more combinations thereof. In some aspects, the user device is a wearable device having a camera, microphone, RFID, GPS, another sensor, or one or more combinations thereof, to capture data in real-time or near real-time (e.g., one or more strings of text, image data, video data, audio data, location data, other types of data, or one or more combinations thereof).

The wearable devices and other user devices, for example, can transmit the data obtained by their corresponding sensors to the multi-link device. For example, the sensor data obtained by the multi-link device can be further transmitted for another user device to perform positional tracking (e.g., six degrees of freedom positional tracking) associated with the user device capturing the sensor data in real-time. In embodiments, a user device can access sensors, application data, tracking data, map data, other user device data, or one or more combinations thereof, for packet transmissions to the multi-link device. In some embodiments, a wearable device can be a watch-type electronic device, a glasses-type wearable device, an upper-torso wearable device (e.g., a shirt having sensors affixed on or within the material of the shirt or a device that is attachable to the shirt), another type of wearable device, or one or more combinations thereof.

In aspects, a user device discussed herein may be configured to communicate using one or more of 4G (e.g., LTE), 5G, 6G, another generation communication system, or one or more combinations thereof. In some aspects, the user device has components to establish a 5G connection with a 5G gNB, and to be served according to 5G over that connection. In some aspects, the user device may be an E-UTRAN New Radio-Dual Connectivity (ENDC) device. ENDC allows a user device to connect to an LTE eNB that acts as a master node and a 5G gNB that acts as a secondary node. As such, in these aspects, the ENDC device may access both LTE and 5G simultaneously, and in some cases, on the same spectrum band.

"Wireless telecommunication services" refer to the transfer of information without the use of an electrical conductor as the transferring medium. Wireless telecommunication services may be provided by one or more telecommunication network providers. Wireless telecommunication services may include, but are not limited to, the transfer of information via radio waves (e.g., Bluetooth®), satellite communication, infrared communication, microwave communication, Wi-Fi, mmWave communication, and mobile communication. Embodiments of the present technology may be used with different wireless telecommunication technologies or standards, including, but not limited to, CDMA 1×Advanced, GPRS, Ev-DO, TDMA, GSM, WiMAX technology, LTE, LTE Advanced, other technologies and standards, or one or more combinations thereof.

A "network" providing the wireless telecommunication services may be a telecommunication network(s), or a portion thereof. A telecommunication network might include an array of devices or components (e.g., one or more base stations). The network can include multiple networks, and the network can be a network of networks. In embodiments, the network is a core network, such as an evolved packet core, which may include at least one mobility management entity, at least one serving gateway, and at least one Packet Data Network gateway. The mobility management entity may manage non-access stratum (e.g., control plane) functions such as mobility, authentication, and bearer management for other devices associated with the evolved packet core.

In some aspects, a network can connect one or more user devices to a corresponding immediate service provider for services such as 5G and LTE, for example. In aspects, the network provides wireless telecommunication services comprising one or more of a voice service, a message service (e.g., SMS messages, MMS messages, instant messaging messages, an EMS service messages), a data service, other types of wireless telecommunication services, or one or more combinations thereof, to user devices or corresponding users that are registered or subscribed to a telecommunication service provider to utilize the one or more services. The network can comprise any communication network providing voice, message, or data service(s), such as, for example, a 1× circuit voice, a 3G network (e.g., CDMA, CDMA2000, WCDMA, GSM, UMTS), a 4G network (WiMAX, LTE, HSDPA), a 5G network, a 6G network, another generation network, or one or more combinations thereof.

Components of the network, such as terminals, links, and nodes (as well as other components), can provide connectivity in various implementations. For example, components of the network may include core network nodes, relay devices, integrated access and backhaul nodes, macro eNBs, small cell eNBs, gNBs, relay base stations, other network components, or one or more combinations thereof. The network may interface with one or more base stations through one or more wired or wireless backhauls. As such, the one or more base stations may communicate to devices via the network or directly. Furthermore, user devices can utilize the network to communicate with other devices (e.g., a user device(s), a server(s), etc.) through the one or more base stations.

As used herein, the term "base station" (used for providing UEs with access to the telecommunication services) generally refers to one or more base stations, nodes, RRUs control components, and the like (configured to provide a wireless interface between a wired network and a wirelessly connected user device). A base station may comprise one or more nodes (e.g., eNB, gNB, and the like) that are configured to communicate with user devices. In some aspects, the base station may include one or more band pass filters, radios, antenna arrays, power amplifiers, transmitters/receivers, digital signal processors, control electronics, GPS equipment, and the like.

For example, the base station may refer to a base transceiver station, a radio base station, an access point, a radio transceiver, a NodeB, an eNB, a gNB, a Home NodeB, a Home eNodeB, another type base station, or one or more combinations thereof. A node corresponding to the base station may comprise one or more of a macro base station, a small cell or femtocell base station, a relay base station, another type of base station, or one or more combinations thereof. In aspects, the base station may be configured as FD-MIMO, massive MIMO, MU-MIMO, cooperative MIMO, 3G, 4G, 5G, another generation communication system, or one or more combinations thereof. In addition, the base station may operate in an extremely high frequency region of the spectrum (e.g., from 30 GHz to 300 GHz), also known as the millimeter band.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, prior relevant technologies have had drawbacks associated with providing appropriate bandwidth for uplink transmissions of large amounts of data and various types of data. For example, devices transmitting data from a cell edge incur uplink power limitations (e.g., 23 dBM-26 dBM for sub-6 GHz bands) associated with an individual 5G modem. Additionally, data and metadata being transmitted over a voice channel can experience blocked communications or interference, and various voice channel transmissions can also incur limited data throughput or may otherwise be unreliable due to voice processing functions in the network (e.g., echo-canceller tuning errors). Additional interference may occur when voice channels are provided through packets rather than through circuits. Additionally, emergency response vehicles and emergency response devices typically require at least three streams for 45 Mbps bandwidth and throughput via uplink transmissions (e.g., from a device in the field of operation, such as multiple body cameras communicating via Wi-Fi, dashboard cameras operating via Ethernet, and audio streams operating via Wi-Fi). Due to the bandwidth and throughput requirements, multiple modems are often required for achieving these uplink conditions. Limitations created by these multiple modem systems still include throughput challenges and interferences associated with the multiple input streams from all of the devices connected with the multiple modems via Wi-Fi, Ethernet, and USB, for example.

The technology provided herein can alleviate the problems discussed above. For example, the technology disclosed herein enhances uplink throughput and reduces interferences, including communications associated with user devices located near a cell edge. Additionally, the technology disclosed herein can reduce the use of multiple modems within a particular location, and can reduce interferences among communications transmitted by the multiple modems of the prior systems. Further, the multi-link device and the techniques described herein can improve communications between or among devices by improving quality of service and user experience, decreasing system latencies, enhancing the reliability and functionality of communications, and can also result in efficient and enhanced reproductions of events captured by user devices in particular locations.

For example, the multi-link device disclosed herein may include a set of antennas corresponding to one or more components of each of a plurality of WAN connections, one or more processors in communication with each of the set of antennas, and computer memory storing computer-usable instructions that, when executed by the one or more processors, cause the one or more processors to perform operations. For example, the multi-link device can establish a plurality of concurrently active WAN connections with one or more cells of one or more base stations based on a mapping between a plurality of LAN connections and each of the plurality of WAN connections. For example, the multi-link device can establish the LAN connections with one or more user devices. As such, the multi-link device can transmit signals including packets or other data to the one or more base stations based at least in part on the mapping between each of the LAN connections with one or more of the WAN connections.

In an embodiment, a system for utilizing wireless telecommunications via the multi-link device is provided. The system comprises the multi-link device, a plurality of user devices, one or more base stations having one or more antennas that provide a coverage area, one or more processors associated with base station, computer memory corresponding to the multi-link device, and computer memory corresponding to the one or more base stations. In this example system, the multi-link device can establish a plurality of WAN connections with one or more of the base stations based on a mapping between each of the LAN connections and each of the WAN connections, the WAN connections being concurrently active. For example, the WAN connections can be based on the multi-link device transmitting a request to the base stations, and the base stations can transmit a response to the multi-link device for establishment of a WAN connection. In some embodiments, the WAN connections are established based on the multi-link device determining, via one or more processors of the multi-link device, a first WAN connection of the plurality of WAN connections has a highest uplink bandwidth of the plurality of WAN connections. In another example, the multi-link device can additionally or alternatively determine, via one or more processors of the multi-link device, a second WAN connection of the plurality of WAN connections has a lowest uplink bandwidth of the plurality of WAN connections. In yet another example, the multi-link device can additionally or alternatively determine, via one or more processors of the multi-link device, a ranking for each of the plurality of WAN connections based on uplink bandwidth.

Further, the LAN connections can be established through a LAN interface of the multi-link device with user devices located in a particular area based on communications between the multi-link device and the user devices. In some embodiments, the multi-link device receives, in real-time, data including audio data, image data, video data, and location data from each of the plurality of user devices connected with the multi-link device via the LAN interface. In response to receiving this data, the multi-link device transmits the data or a portion thereof (in some embodiments, processes the data and subsequently transmits the processed data) to one or more base stations via one or more WAN connections. In one example embodiment, the multi-link device transmits video data to a first base station via a first WAN connection based on a first VLAN ID assigned to a first LAN connection. Continuing the example, in some embodiments, the multi-link devices transmits audio data to a second base station via a second WAN connection based on a second VLAN ID assigned to a second LAN connection. Continuing the example, in some embodiments, the multi-link devices transmits location metadata from the video and audio data to each of the first and second base stations. In this example system, one or more user devices, located in an area different from the user devices transmitting the real-time data to the multi-link device, can receive the video data, the audio data, and the location data (e.g., from one or more base stations or a core network in communication with the base stations) for the recreation of an event captured by the plurality of user devices in real-time.

In another embodiment, a method is provided for utilizing the multi-link device. The method comprises receiving a first set of data from each of a plurality of user devices via the multi-link device having a local area network (LAN) interface capable of establishing a plurality of LAN connections with user devices. The method also comprises receiving a second set of data from each of the plurality of user devices via the multi-link device. The method also comprises establishing, via the multi-link device, a plurality of wide area network (WAN) connections with a plurality of base stations based on a mapping between each of the plurality of LAN connections and each of the plurality of WAN connections, the plurality of WAN connections being concurrently active. The method also comprises transmitting, via the multi-link device, the first set of data to a first base station of the plurality of base stations and the second set of data to a second base station of the plurality of base stations based on the mapping.

Another embodiment includes one or more non-transitory computer storage media having computer-executable instructions embodied thereon, that when executed by at least one processor, cause the at least one processor to perform a method. The method comprises receiving a first set of data from user devices via a local area network (LAN) interface of a multi-link device, the LAN interface being capable of establishing a plurality of LAN connections for receiving data from the user devices. The method also comprises mapping each of the plurality of LAN connections to one or more of a plurality of wide area network (WAN) connections with one or more base stations, wherein the plurality of WAN connections are concurrently active. The method also comprises determining a first WAN connection of the plurality of WAN connections has a highest uplink bandwidth of the plurality of WAN connections. The method also comprises based on the mapping and determining the first WAN connection has the highest uplink bandwidth, causing the multi-link device to transmit the first set of data via the first WAN connection.

Turning now to FIG. 1, example environment 100 supports enhanced wireless telecommunication services via a multi-link device, in accordance with one or more embodiments disclosed herein. Example environment 100 is but one example of a suitable environment for the improved telecommunications disclosed herein, and is not intended to suggest any limitation as to the scope of use or functionality of the invention. Neither should the environment 100 be interpreted as having any dependency or requirement relating to any one or combination of components illustrated.

Example environment 100 includes user devices 102A-102F, multi-link device 104, communication link 106 between user device 102A and user device 102B, network 108, coverage areas 110A-110C, base stations 114A-114C, terrestrial communication links 116A-116C associated with the base station 114A, terrestrial communication link 116D associated with base station 114B, satellites 120A-120C, communication links 122A and 122B associated with satellite 120A, communication links 124A and 124B associated with satellite 120B, communication link 126 between satellites 120A and 120B, and communication links 128A and 128B associated with satellite 120C.

Example environment 100 may be associated with one or more of a non-terrestrial network, an LTE network, an LTE-A network, an LTE-A Pro network, an NR network, an mmWave network, another type of network, or one or more combinations thereof. In some embodiments, the example environment 100 may support enhanced broadband communications, ultra-reliable (e.g., mission critical) communications, low latency communications, communications with low-cost and low-complexity devices, another type of communication, or one or more combinations thereof.

In embodiments, example environment 100 can utilize both licensed and unlicensed radio frequency bands. For example, the example environment 100 may employ License Assisted Access, LTE-Unlicensed radio access technology, or NR technology in an unlicensed band (e.g., 5 GHz industrial, scientific, and medical band). When operating in unlicensed radio frequency bands, base stations, satellites, or user devices may employ carrier sensing for collision avoidance and detection. In some examples, operations in unlicensed bands may be based on a carrier aggregation configuration and component carriers operating in a licensed band. Operations in unlicensed spectrum may include downlink transmissions, uplink transmissions, P2P transmissions, D2D transmissions, another type of unlicensed spectrum operation, or one or more combinations thereof.

User devices 102A and 102B may wirelessly communicate via one or more wireless telecommunication services provided by one or more base stations (e.g., base station 114A), one or more satellites (e.g., satellites 120A and 120B), other types of wireless telecommunication devices, or one or more combinations thereof. In example environment 100, network 108, base stations 114A and 114B, and satellites 120A-120C can provide coverage areas 110A-110C for supporting communication signals according to one or more radio access technologies. Supported communication signals within coverage area 110A-110C can include MU-MIMO and SU-MIMO transmissions, for example.

In embodiments, the user devices 102A-102F can be stationary, mobile, or one or more combinations thereof at different times. In embodiments, one or more of the user devices 102A-102F may have different capabilities. For example, as illustrated in example environment 100, user devices 102A and 102B can be devices in different forms or devices having different capabilities. The user devices 102A-102F may be able to communicate with various types of devices, such as other UEs, various types of base stations, or network equipment (e.g., core network nodes, relay devices, integrated access and backhaul nodes, other network equipment, or one or more combinations thereof).

The user devices 102A-102F may include a unit, a station, a terminal, or a client, for example. The user devices 102A-102F may also include a wireless local loop station, an IoT device, an Internet of Everything device, a machine type communication device, an evolved or enhanced machine type communication device, another type of user device, or one or more combinations thereof. The machine type communication device or the evolved or enhanced machine type communication device may include, for example, one or more robots, drones, remote devices, sensors, meters, monitors, location tags, etc., that may communicate with multi-link device 104, a base station, another device (e.g., remote device), or some other entity. In some embodiments, user devices 102C-102F may be implemented in various objects such as appliances, or vehicles, meters, and other objects. In some embodiments, the user devices 102A-102F may sometimes act as a relay as well as a base station (e.g., base station 114A) and the network equipment including macro eNBs or gNBs, small cell eNBs or gNBs, or relay base stations, for example.

As depicted in example environment 100, multi-link device 104 is located within coverage area 100C, which is capable of receiving and transmitting communications associated with base station 114A, base station 114B, satellite 120A, and satellite 120C. In embodiments, user devices 102C-102F are located within a particular range of the cell edges of coverage areas 110A and 110B. Coverage area 110C can provide services from network 108, such as network provider services including the Internet, Intranet, Internet Protocol Multimedia Subsystem, Packet-Switched Streaming Service, another type of network provider service, or one or more combinations thereof. Multi-link device 104 is also capable of receiving and transmitting communications with user devices 102C-102F.

In embodiments, user devices 102C-102F can be configured to support ultra-reliable communications, low-latency communications, mission critical communications, ultra-reliable low-latency communications, ultra-reliable functions, low-latency functions, critical functions, mission critical push-to-talk functions, mission critical video functions, other types of communications, or one or more combinations thereof. As such, the multi-link device 104 can receive ultra-reliable communications, low-latency communications, mission critical communications, ultra-reliable low-latency communications, ultra-reliable data, low-latency data, critical data, mission critical push-to-talk data, mission critical video data, audio data, other types of data, or one or more combinations thereof, from the user devices 102C-102F. In some embodiments, the multi-link device 104 can process this data and subsequent transmit the processed data.

For example, the multi-link device 104 may have one or more processors, such as an image processor, a video processor, an audio processor, or one or more combinations thereof. In some embodiments, the multi-link device 104 may have a processor or processing unit capable of processing image data, video data, audio data, ultra-reliable data, low-latency data, critical data, mission critical push-to-talk data, mission critical video data, other types of data, or one or more combinations thereof. In some embodiments, the one or more processors or processing units of the multi-link device 104 may include a system-on-a-chip, a processor core, a graphics processor unit, a central processing unit, an accelerator (e.g., a digital signal processor, a graphics accelerator, a compression accelerator, an artificial intelligence accelerator), a chipset processor, a general-purpose processor, a general-purpose graphics processor unit, an accelerated processing unit, a field-programmable gate array, a neural network processing unit, a data processor unit, a controller, another type of processor or processor unit, or one or more combinations thereof. In some embodiments, the multi-link device 104 includes one or more processor units that are asymmetric or heterogeneous to another processor unit. In some embodiments, the processor unit of the multi-link device 104 is located in a single integrated circuit component (e.g., multi-chip module) or in separate integrated circuit components. In some embodiments, the multi-link device 104 has stacked high bandwidth memory, one or more shared cache memories, one or more input/out controllers, a memory controller, or one or more combinations thereof.

In some embodiments, the multi-link device 104 can transmit this data (e.g., ultra-reliable data, low-latency data, critical data, mission critical push-to-talk data, mission critical video data, audio data, other types of data) or a portion of this data to base station 114A, base station 114B, satellite 120A, satellite 120C, network 108, another device, or one or more combinations thereof. For example, the multi-link device 104 may have a time division digital processing component for digital processing of the data received from user device 102C-102F, and a frequency division digital processing component to provide signaling to the time division digital processing component. To illustrate, the time division digital processing component can provide signaling to a digital-to-analog converter of the multi-link device 104, the digital-to-analog converter can convert digital signals to analog signals, an intermediate frequency analog processing component of the multi-link device 104 can perform intermediate frequency analog processing on the analog signals, and a radio frequency analog processing component can perform radio frequency analog processing thereafter.

In embodiments, the multi-link device 104 can establish a plurality of network connections (e.g., WAN connections) with one or more base stations (e.g., base station 114A, base station 114B), with one or more satellites (e.g., satellite 120A, satellite 120C), another type of device, or one or more combinations thereof. In embodiments, the multi-link device 104 has a set of antennas corresponding to each of the WAN connections. In embodiments, one or more antennas of one or more of the sets of antennas for each WAN connection can operate on high frequency bands, very high frequency bands, ultra-high frequency bands, L bands, S bands, C bands, X bands, Ku bands, Ka bands, V bands, W bands, millimeter wave bands, another type of frequency band, or one or more combinations thereof. For example, a first WAN connection between the multi-link device 104 and a first node of a first base station (e.g., base station 114A), a second WAN connection between the multi-link device 104 and a second node of the first base station, a third WAN connection between the multi-link device 104 and a first node of a second base station (e.g., base station 114B), a fourth WAN connection between the multi-link device 104 and a second node of the second base station, and a fifth WAN connection between the multi-link device 104 and a first node of a first satellite (e.g., satellite 120C) can be established based on quality of service information requests to the base stations 114A-114B and the satellite 120C. As one illustrative example, the first WAN connection can correspond to uplink communications over one or more high frequency bands, the second WAN connection can correspond to uplink communications over one or more very high frequency bands, the third WAN connection can correspond to uplink communications over one or more ultra-high frequency bands, and the fourth WAN connection can correspond to uplink communications over one or more millimeter wave bands. In some embodiments, the first WAN connection can be assigned or granted a first set of air link resources for uplink transmissions from the multi-link device 104, the second WAN connection can be assigned or granted a second set of air link resources for uplink transmissions from the multi-link device 104, and the third WAN connection can be assigned or granted a third set of air link resources for uplink transmissions from the multi-link device 104. In some embodiments, the first WAN connection is a wireless WAN connection and the second WAN connection is a wired WAN connection. In some embodiments, the multi-link device 104 may utilize wireless broadband communications effectuated between two or more fixed locations.

In some embodiments, the WAN connections with the one or more base stations are established based on one or more RSSI, one or more SNR, one or more bit error rates, one or more modulation and coding scheme index values, one or more data throughput factors, radiation patterns, another type of bandwidth metric, or one or more combinations thereof. For example, one or more servers corresponding to coverage area 110C may execute instructions for an antenna controller of the multi-link device 104 based on one or more frequency band metrics of one or more of base stations 114A-114B, one or more of satellites 120A and 120C, or one or more combinations thereof. In some embodiments, the operations of the sets of antennas of the multi-link device 104 can be executed based on firmware applications, software, algorithms, or one or more combinations thereof, for utilizing one or more interface adapters, monitoring wireless link state information, proximity sensor detection, or one or more combinations thereof. Continuing the example, antenna radiation patterns for the sets of antennas of the multi-link device 104, power levels of the sets of antennas, and channel parameters of the sets of antennas can be adjusted by the antenna controller and the firmware applications, software, and algorithms. The multi-link device 104, in some embodiments, determines a signal strength and measurements corresponding to WAN connection quality (e.g., performance rating, upload speed, download speed, a latency measurement associated with an orientation and location of the multi-link device 104) for adjusting a power level, a radiation pattern, or a channel parameter associated with one or more antennas of one or more of the sets of antennas of the multi-link device 104. In some embodiments, the multi-link device 104 has one or more processors or one or more processor units for each of the sets of antennas corresponding to each WAN connection.

In some embodiments, the first WAN connection is associated with a first carrier operating in both licensed and unlicensed spectrums, the second WAN connection is associated with a second carrier operating in the licensed spectrum, and the third WAN connection is associated with a third carrier operating in the unlicensed spectrum. In some embodiments, the multi-link device 104 can support software-based networking in coverage area 110C with traffic bursting. Additionally or alternatively, in some embodiments, the multi-link device 104 is capable of supporting enhanced mobile broadband data and corresponding control information, massive machine type communications and corresponding control information, or one or more combinations thereof.

The multi-link device 104 may also have a LAN interface for establishing a plurality of LAN connections with user device 102C-102F. The multi-link device 104 can, in some embodiments, allow restricted access by user devices (e.g., user devices 102C-102F) having an association with the multi-link device 104 (e.g., user devices in a Closed Subscriber Group). Stated differently, the user device 102C-102F can be a Closed Subscriber Group, in some embodiments. In some embodiments, the multi-link device 104 is associated with a home IoT network, a vehicle IoT network, an HSS, an MME, or one or more combinations thereof. For example, in some embodiments, the user devices 102C and 102D establish the LAN connection using the home IoT network and the user device 102E and 102F establish the LAN connection using the vehicle IoT network. In some embodiments, one or more of the LAN connections operate at 2.4 GHz band. In some embodiments, the LAN connections and the WAN connections can use the Unlicensed National Information Infrastructure band (which typically operates around the 5 MHz frequency band). In some embodiments, a first LAN connection operates on a first frequency band, the second LAN connection operates on a second frequency band, the third LAN connection operates on a third frequency band, and the fourth LAN connection operates on a fourth frequency band. For example, in some embodiments, a first receiving antenna associated with the first LAN connection is a high-band antenna, a second receiving antenna associated with the second LAN connection is a medium-band antenna, a third receiving antenna associated with the third LAN connection is a low-band antenna, and a fourth receiving antenna associated with the fourth LAN connection is an unlicensed band antenna.

Network 108 can provide one or more various wireless telecommunication services and can be one or more telecommunication networks or a portion of a telecommunication network. In some embodiments, network 108 is a network of networks. In some embodiments, the network is a core network (e.g., a 5G Core Network, an evolved packet core). For example, the core network can provide user authentication, tracking, Internet Protocol connectivity, access authorization, other types of access, mobility, and routing functions, or one or more combinations thereof. The core network can include a control plane entity for managing access and mobility, a user plane entity that routes packets or interconnects with external networks (e.g., a serving gateway). In some embodiments, the network 108 can provide operator services, such as access to Internet, access to Intranet, an IP Multimedia Subsystem, a Packet-Switched Streaming Service, another type of operator service, or one or more combinations thereof. Base stations 114A-114B may communicate with the network 108 via a core network, one or more other base stations, one or more satellites, or one or more combinations thereof, over one or more backhaul links (e.g., via an X2, Xn, or other interface) either directly (e.g., directly between base stations), or indirectly (e.g., via core network), or one or more combinations thereof. The backhaul links may be or include one or more wireless links, for example.

Base stations 114A-114B may operate using MIMO transmissions (e.g., the base station 114 can be configured as FD-MIMO, massive MIMO, MU-MIMO, cooperative MIMO, 3G, 4G, 5G, another generation communication system, or one or more combinations thereof) for providing telecommunication services to one or more of user devices, or one or more combinations thereof. The base stations 114A-114B may perform one or more of the following functions: transfer user data, radio channel ciphering and deciphering, integrity protection, header compression, mobility control functions (e.g., handover, dual connectivity), inter-cell interference coordination, connection setup and release, load balancing, distribution for non-access stratum messages, Non-Access Stratum node selection, synchronization, radio access network sharing, multimedia broadcast multicast service, subscriber and equipment trace, radio access network information management, paging, positioning, and delivery of warning messages.

In some embodiments, one or more base station antennas or antenna arrays may be co-located at an antenna assembly, such as an antenna tower. In some examples, antennas or antenna arrays associated with base stations 114A-114B may be located in diverse geographic locations. In some aspects, one or more nodes corresponding to base stations 114A-114B may comprise one or more macro cells, one or more small cells, one or more relay base stations, one or more repeaters, one or more femtocells, other types of cells, or one or more combinations thereof. In some embodiments, base stations 114A-114B may be movable and therefore provide communication coverage for a moving geographic coverage area 110. Further, communication links 116A-116D may use MIMO antenna technology, including spatial multiplexing, beamforming, transmit diversity, other MIMO functions, or one or more combinations thereof. Communication links 116A-116D may be through one or more carriers.

Satellites 120A-120C may communicate with base stations 114A-114B, multi-link device 104, and user devices 102A-102F (or other high altitude or terrestrial communications devices, for example). "Satellite" is also referred to as a space vehicle or communication satellite. Satellites 120A-120C may be any suitable type of communication satellite configured to relay communications between different end nodes in a wireless communication system. Satellites 120A-120C may be or include a space satellite, a balloon, a dirigible, an airplane, a drone, an unmanned aerial vehicle, another type of satellite, or one or more combinations thereof. In some examples, the satellites 120A-120C may be in a geosynchronous or geostationary earth orbit, a low earth orbit, a medium earth orbit, another type of orbit, or one or more combinations thereof.

In some embodiments, satellites 120A-120C may be a multi-beam satellite configured to provide service for multiple service beam coverage areas in a predefined geographical service area (e.g., coverage areas 110A-110C). The satellites 120A-120C may be any distance away from the surface of the earth.

In some embodiments, satellites 120A-120C may be deployed at an altitude of 18 km to 25 km (e.g., a geostationary balloon satellite), wherein the stratosphere has low wind speeds (e.g., 5 m/s to 40 m/s) and low turbulence. In embodiments, satellites 120A and 120B may be configured to communicate with each other (e.g., via communication link 126). As such, the communication links among satellites 120A-120C (e.g., communication link 126) may include a free space optical link, a microwave link, electromagnetic wave signals via mmWaves, optical signals via a laser, another type of communication link, or one or more combinations thereof. In embodiments, satellites 120A-120C may be configured to communicate via a wireless common public radio interface protocol, a dedicated wireless front haul protocol developed for high-altitude-to-high-altitude, another protocol, or one or more combinations thereof.

In some embodiments, a cell or coverage area may be provided or established by satellites 120A-120C as part of a non-terrestrial network. Satellites 120A-120C may, in some cases, perform the functions of base stations 114A-114B, act as a bent-pipe satellite, act as a regenerative satellite, act as another type of satellite, or one or more combinations thereof. In other cases, satellites 120A-120C may be a smart satellite, or a satellite with intelligence. For example, a smart satellite may be configured to perform more functions than a regenerative satellite (e.g., may be configured to perform particular algorithms beyond those used in regenerative satellites or to be reprogrammed, for example). A bent-pipe transponder or satellite may be configured to receive signals from ground base stations (e.g., base stations 114A-114B) and transmit those signals to different ground base stations. In some embodiments, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, another type of satellite or regenerative transponder function, or one or more combinations thereof. For example, a bent-pipe satellite may receive a signal from a base station and may relay the signal to a user device or base station, or vice-versa.

User device 102A and multi-link device 104 may communicate with satellites 120A-120C using communications links 122A, 124A and 128B. In embodiments, base station 114A and 114B communicate with satellites 120A-120C using communication links 122B, 124B, and 128A. In some embodiments, timing adjustments may be used to account for propagation delays associated with communications links 122A, 124A and 128B. Additionally or alternatively, timing adjustments may be used to account for propagation delays associated with communication links 116A-116D between one of the terrestrial devices and base stations 114A-114B. Further, propagation delays associated with communication links 122B, 124B, and 128A between base stations 114A-114B and satellites 120A-120C, as well as a variation in the propagation delays due to movement of the satellites 120A-120C. For example user device 102A or multi-link device 104 may account for variation in propagation delay when determining an uplink timing for uplink communications via one or more of satellites 120A-120C.

Satellites 120A-120C may have one or more antennas, which may be used to employ techniques including transmit diversity, receive diversity, MIMO communications, mmWave communications, beamforming, mmWave beamforming, other types of techniques, or one or more combinations thereof. These MIMO communications may employ multipath signal propagation to increase the spectral efficiency by transmitting or receiving multiple signals via different spatial layers, which may be referred to as spatial multiplexing. Further, these techniques may be employed by the one or more antennas of the satellites 120A-120C via different antennas or different combinations of antennas, for example. Different spatial layers may be associated with different antenna ports used for channel measurement and reporting.

Further, satellites 120A-120C can shape or steer one or more beams along a spatial path between the respective satellite and a user device, for example. Beamforming can be implemented by combining signals communicated by the satellite antenna elements of an antenna array, such that signals propagating at an orientation associated with the antenna array are adjusted by an amplitude offset or a phase offset associated with a constructive or destructive interference. The amplitude offset and phase offset may be associated with a beamforming weight. In some embodiments, a plurality of antenna arrays of the satellites 120A-120C conduct beamforming operations by transmitting signals (e.g., synchronization signals, reference signals, beam selection signals, other control signals, other types of beamforming signals, or one or more combinations thereof) multiple times in different directions. For example, an antenna array of at least one of the satellites 120A-120C can transmit a signal according to different beamforming weight sets associated with different directions of transmission.

In embodiments, base stations 114A-114B and satellites 120A-120C can each transmit beams in a plurality of spatial directions. As such, user device 102A and multi-link device 104 can perform beam sweeps with the base stations 114A-114B or at least one of satellites 120A-120C. In some embodiments, user device 102A and multi-link device 104 can transmit one or more beams in a plurality of different spatial directions and the base stations 114A-114B and satellites 120A-120C can listen or scan for the beam transmissions. In some embodiments, the multi-link device 104 uses satellite 120C for a fallback connection with one or more of the plurality of WAN connections. For example, the multi-link device 104 may determine that the satellite 120C has a lowest uplink bandwidth of the plurality of WAN connections or that the satellite 120C has a lowest latency measurement of the plurality of WAN connections, such that the multi-link device 104 utilizes the satellite 120C for the fallback connection based on one or more of these determinations. In some embodiments, the multi-link device 104 uses satellite 120C for a fallback connection based on quality of state data associated with the satellite 120C.

In embodiments, one or more of the base stations 114A-114B and satellite 120C, or one or more combinations thereof, can provide channel reciprocity-based beamforming to the multi-link device 104. For example, in one implementation, the reciprocity-based beamforming is provided based on assigning the satellite 120C for the fallback connection and by combining signals communicated by the satellite antenna elements of an antenna array of satellite 120C, wherein the signals propagate at an orientation associated with the antenna array based on an amplitude offset, a phase offset, another type of adjustment factor, or one or more combinations thereof, corresponding to the WAN connection with the multi-link device 104. In some embodiments, reciprocity-based beamforming is provided based on an uplink timing for an uplink communication between base station 114A, base station 114B or satellite 120C associated with multi-link device 104.

In embodiments, the base stations 114A-114B or satellite 120C can provide the channel reciprocity-based beamforming to the multi-link device 104 based on a determined beam weight. For example, a beam weight can define an adjustment corresponding to an antenna element (e.g., associated with an orientation of a respective antenna array) of a base station or satellite. In embodiments, the beam weight can be determined based on an orientation of an antenna or antenna array of the associated base station (e.g., base station 114A or 114B) or satellite (e.g., satellite 120C), an orientation of the multi-link device 104, an orientation of the user devices 102C-102F, other position and location data, or one or more combinations thereof. The beam weight can be associated with one or more of a phase and amplitude for providing the channel reciprocity-based beamforming. For example, the beam weight can be applied to adjust a direction and strength of one or more of a main lobe, null, side lobe, or one or more combinations thereof. A phase weight can be phase-only (e.g., only a phase shift with no amplitude change) or a phase and gain (e.g., phase shift and amplitude gain).

In embodiments, the multi-link device 104 can transmit one or more signals (e.g., including one or more sets of data) to the one or more base stations 114A-114B or the satellite 120C based at least in part on the plurality of WAN connections with one or more of base stations 114A-114B and the satellite 120C and based at least in part on the plurality of LAN connections with user devices 102C-102F. For example, the multi-link device 104 can transmit a set of data to one or more nodes of base station 114A, base station 114B, or satellite 120C based on an orientation of an antenna or antenna array of the associated base station, an orientation of the multi-link device 104, an orientation of the user devices 102C-102F, other position and location data, or one or more combinations thereof. For example, a first LAN connection between user devices 102C-102F can be mapped to a first WAN connection with a first node of base station 114A, a second LAN connection between user devices 102C-102F can be mapped to a second WAN connection with a second node of base station 114A, a third LAN connection between user devices 102C-102F can be mapped to a third WAN connection with base station 114B, and a fourth LAN connection between user devices 102C-102F can be mapped to a fourth WAN connection with satellite 120C. In some embodiments, the fourth WAN connection with satellite 120C is the fallback connection. Continuing the example, the mapping between the LAN and WAN connections can be based on a direction and strength of one or more of a main lobe, null, side lobe, or one or more combinations thereof, corresponding to each of the first and second nodes of base station 114A, the base station 114B, and the satellite 120C. In some embodiments, the mapping is based on an orientation of an antenna or antenna array of the associated base station (e.g., base station 114A or 114B) or satellite (e.g., satellite 120C). In some embodiments, the mapping is based on an amplitude offset, a phase offset, another type of adjustment factor, or one or more combinations thereof, corresponding to the WAN connection with the base stations 114A-114B and satellite 120C.

In some embodiments, the mapping between the WAN connections with base stations 114A-114B and satellite 120C and the LAN connections with the user device 102C-102F can be based on a VLAN ID for each of the LAN connections facilitated by the LAN interface of the multi-link device 104. For example, a VLAN ID can be based on the type of data being transmitted. In one example, a first VLAN ID of a first LAN connection with user device 102C corresponds to mission critical push-to-talk data, and a second VLAN ID of a second LAN connection with user device 102F corresponds to mission critical video data. As another example, a first VLAN ID of a first LAN connection with user devices 102C-102F corresponds to ultra-reliable communications, a second VLAN ID of a second LAN connection with user devices 102C-102F corresponds to low-latency communications, and a third VLAN ID of a third LAN connection with user device 102C-102F corresponds to mission critical communications. In some embodiments, the transmission of data from the multi-link device 104 to the base station 114A, base station 114B, or satellite 120C is based on the time division digital processing component of multi-link device 104 for digital processing of the data received from user devices 102C-102F, and the frequency division digital processing component of multi-link device 104.

In embodiments, each packet transmitted to the multi-link device 104 from each of user devices 102C-102F may have a packet header including a VLAN ID for determining which WAN connection to transmit the packet or processed packet data from. In some embodiments, the VLAN ID is created via an application specific integrated circuit. Further, each of the VLAN IDs may have an available status or a routed status, wherein the available status triggers an additional mapping of the VLAN ID to one or more of the WAN connections. In some embodiments, the VLAN IDs are grouped for the mapping based on quality of service data continuously received from base station 114A, base station 114B, or satellite 120C. Continuing the example, the VLAN IDs can also be grouped based on the type of data (e.g., mission critical data). In some embodiments, the VLAN IDs are also grouped based on the type of uplink transmission frequency (e.g., millimeter wave). In some embodiments, the mapping between a first LAN connection with one or more of the WAN connections can be based on a first VLAN ID associated with ultra-reliable video data and a second LAN connection with one or more WAN connections can be based on a second VLAN ID associated with low-latency video data.

Figure 2:
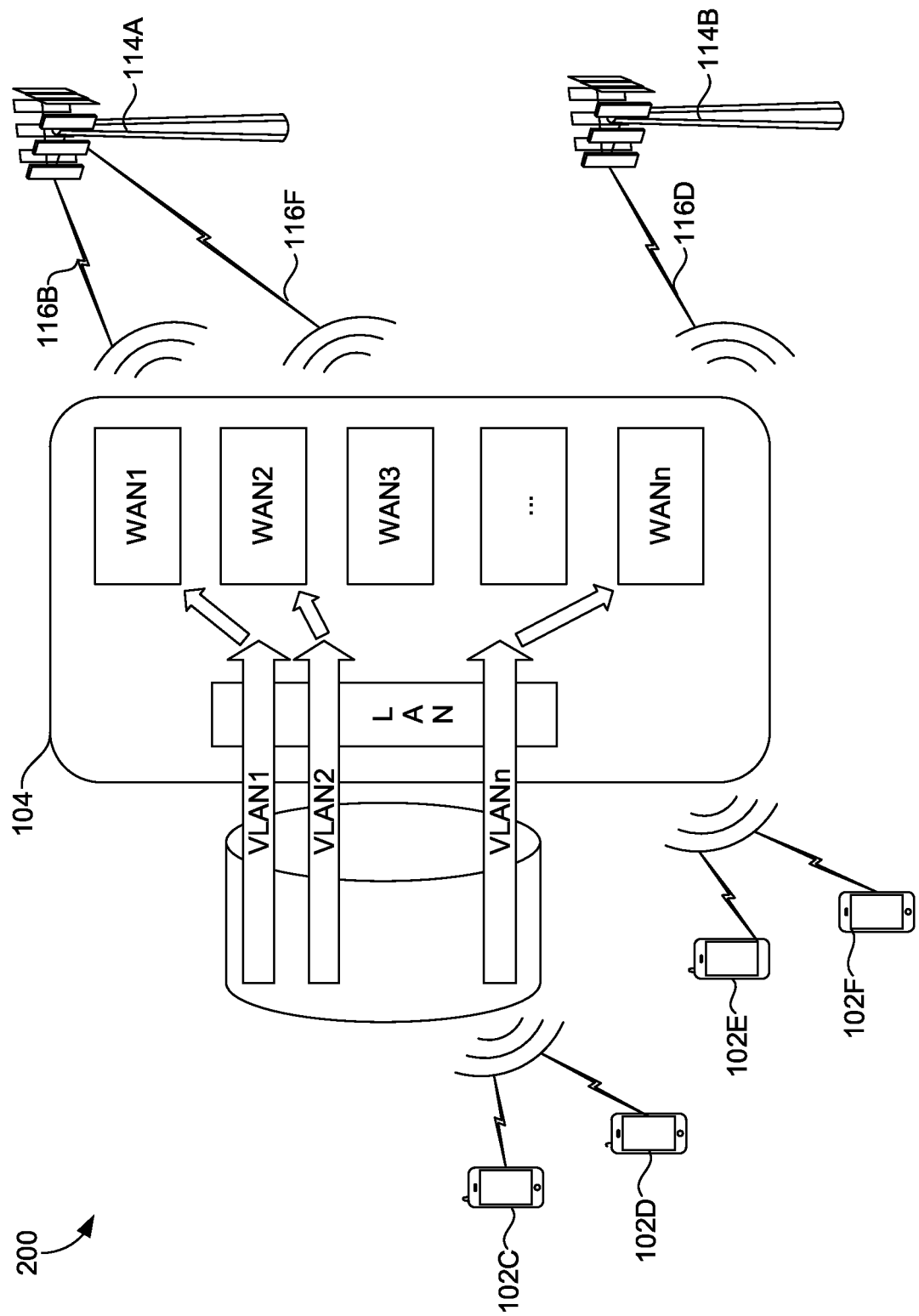
FIG. 2 depicts another example operating environment including the multi-link device, in accordance with aspects herein.

Turning to FIG. 2, example operating environment 200 includes user device 102C-102F each having one or more LAN connections with the multi-link device 104, such that the multi-link device 104 can transmit data or portions of data received from one or more of the user devices 102C-102F (e.g., ultra-reliable audio data, low-latency audio data, mission critical audio data, ultra-reliable low-latency audio data, ultra-reliable video data, low-latency video data, mission critical video data, ultra-reliable low-latency video data, ultra-reliable image data, low-latency image data, mission critical image data, ultra-reliable low-latency image data, other types of ultra-reliable data, other types of low-latency data, other types of mission critical data, other types of ultra-reliable low-latency data, or one or more combinations thereof) to base station 114A or base station 114B based on one or more of the WAN connections corresponding to communication links 116B, 116D, and 116F.

In some embodiments, multi-link device 104 has a plurality of antennas corresponding to each of the WAN connections, wherein a first WAN connection with base station 114A has a high frequency band uplink, a second WAN connection with base station 114B has a very high frequency band uplink, and a third WAN connection with base station 114A has an ultra-high frequency band uplink. In embodiments, multi-link device 104 can determine a signal quality and resistivity of each cell corresponding to base stations 114A and 114B and establish the WAN connections with base stations 114A and 114B based on the signal quality and resistivity. In some embodiments, each of the plurality of user devices 102C-102F are within a threshold distance from at least one of the plurality of user devices. Stated differently, user device 102C is within a threshold distance of user device 102D, 102E, or 102F. In some embodiments, each of user device 102C-102F are within a threshold distance from multi-link device 104. In some embodiments, multi-link device 104 is within a threshold distance from the cell edge of base station 114A and within another threshold distance from the cell edge of base station 114B. In some embodiments, each of the user device 102C-102F are located within a predetermined range from the cell edge of base stations 114A-114B.

In embodiments, multi-link device 104 can receive and extract location data from the metadata of packets received by user device 102C-102F. In embodiments, the location data may comprise GPS or other satellite location services data, terrestrial triangulation data, an access point location data associated with a user device, other location data, or one or more combinations thereof. The location data may indicate one or more geographic locations of one or more of a user device, an antenna or antenna array of a base station or satellite, a coverage area, a cell associated with a coverage area, or one or more combinations thereof. In embodiments, one or more processors or processor units (e.g., a system-on-a-chip, a processor core, a graphics processor unit, a central processing unit, a chipset processor, a general-purpose processor, a general-purpose graphics processor unit, an accelerated processing unit, a field-programmable gate array, a neural network processing unit, a data processor unit, a controller, another type of processor or processor unit, or one or more combinations thereof) of multi-link device 104 can extract and process the location data from the metadata received from user devices 102C-102F.

In embodiments, multi-link device 104 can transmit location data based on extracting and processing the metadata received from user devices 102C-102F. In some embodiments, the multi-link device 104 transmits the location data to base station 114A or base station 114B. For example, multi-link device 104 can map the location data (e.g., via the one or more processors or processor units) received from the user device 102C-102F to video data, audio data, image data, other types of data, or one or more combinations thereof, and transmit the location data to base stations 114A or 114B based on the mapping of the location data. For example, in some embodiments, the multi-link device 104 maps the location data to one or more of ultra-reliable audio data, low-latency audio data, mission critical audio data, ultra-reliable low-latency audio data, ultra-reliable video data, low-latency video data, mission critical video data, ultra-reliable low-latency video data, ultra-reliable image data, low-latency image data, mission critical image data, ultra-reliable low-latency image data, other types of ultra-reliable data, other types of low-latency data, other types of mission critical data, other types of ultra-reliable low-latency data, or one or more combinations thereof.

Figure 3:
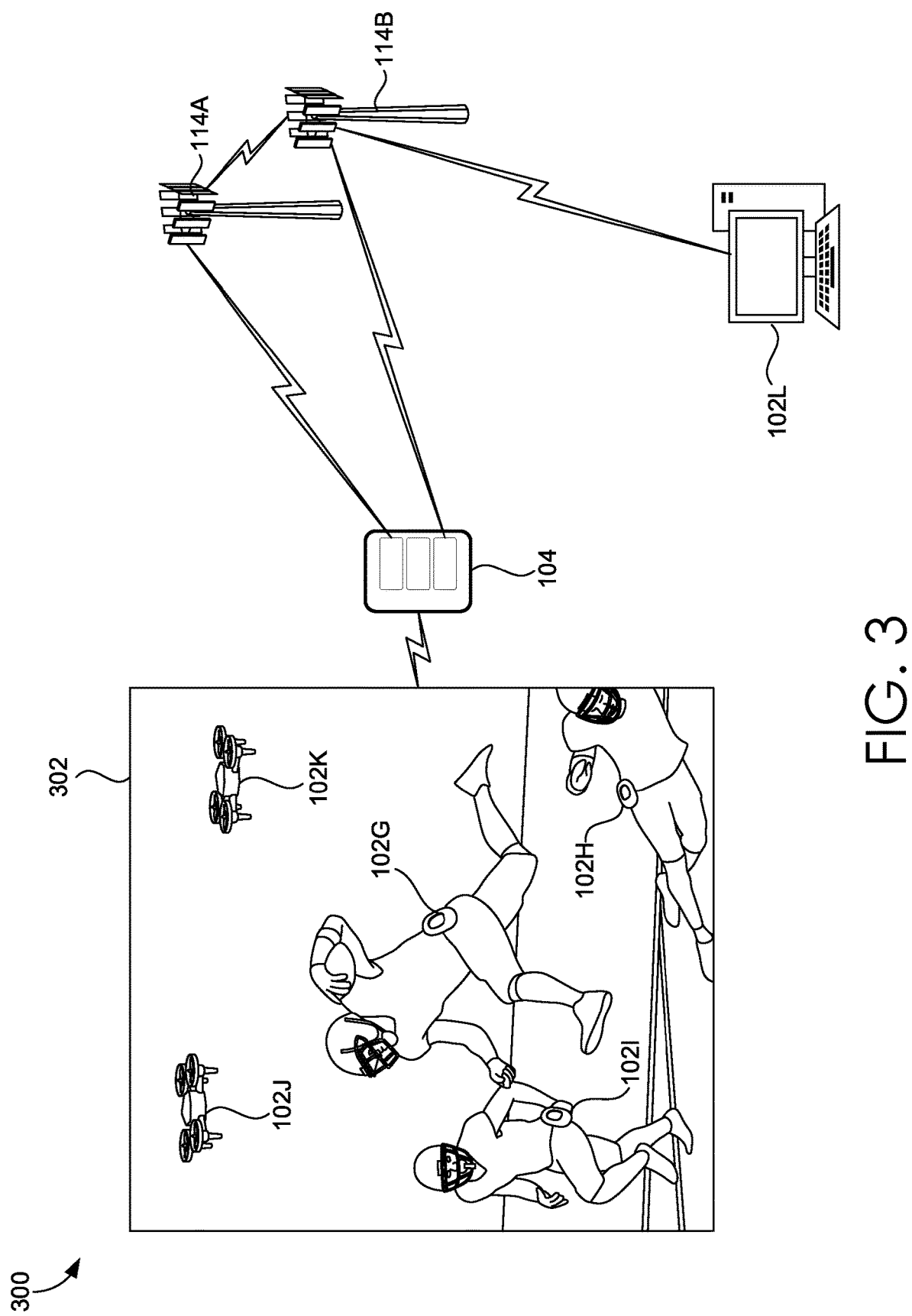
FIG. 3 depicts an example operating environment for recreating an event in real-time, in accordance with aspects herein.

Turning to FIG. 3, example operating environment 300 includes event recreation 302 (e.g., a sporting event, an emergency event, a filmed scene for television) generated by user device 102L based on multi-link device 104 receiving event data from user devices 102G-102K based on LAN connections established with user devices 102G-102K over LAN interface of multi-link device 104, the event recreation 302 also being generated based on the multi-link device 104 transmitting the event data from the multi-link device to the base stations 114A and 114B. In example environment 300, the base stations 114A and 114B can communicate via a backhaul link (e.g., a wired or wireless backhaul). Further, base station 114B is also capable of transmitting and receiving data from user device 102L. In some embodiments, the base station 114A is also capable of transmitting and receiving data from user device 102L.

In some embodiments, the user devices 102J and 102K are machine type communication devices or an evolved or enhanced machine type communication device, which may include, for example, one or more drones or aerial devices capable of communicating with multi-link device 104 via one or more of the LAN connections. User devices 102J and 102K can capture data in real-time or near real-time (e.g., one or more strings of text, image data, video data, audio data, location data, other types of data, or one or more combinations thereof). In embodiments, the user devices 102G-102I are wearable devices having a camera, microphone, RFID, GPS, another sensor, or one or more combinations thereof, to capture data in real-time or near real-time (e.g., one or more strings of text, image data, video data, audio data, location data, other types of data, or one or more combinations thereof). In some embodiments, a wearable device can be a watch-type electronic device, a glasses-type wearable device, an upper-torso wearable device (e.g., a shirt having sensors affixed on or within the material of the shirt or a device that is attachable to the shirt), another type of wearable device, or one or more combinations thereof.

In embodiments, the data obtained by the multi-link device 104 from the user device 102G-102K over the LAN connection can be further transmitted for user device 102L to recreate the event based on the data received by multi-link device 104. For example, the multi-link device 104 can transmit such data via the plurality of WAN connections based on mappings between each of the LAN connections with one or more of the WAN connections. In some embodiments, the multi-link device 104 transmits location data based on positional tracking (e.g., six degrees of freedom positional tracking) associated with the each of the user devices 102G-102K capturing the sensor data in real-time or near real-time. In embodiments, user devices 102G-102K can access sensors, application data, tracking data, map data, other user device data, or one or more combinations thereof, for packet transmissions to the multi-link device 104 based on the LAN connections. In some embodiments, VLAN IDs associated with mapping each LAN connection to the one or more WAN connections can correspond to a particular dataset, such as a first VLAN ID for image sensor data, a second VLAN ID for map data, and a third VLAN ID for audio data, for example.

In some embodiments, the mapping between the LAN connections of the multi-link device 104 and the WAN connections of the multi-link device 104 is based on a PUCCH corresponding to the base station 114A or 114B and a WAN connection, a PUSCH corresponding to the base station 114A or 114B and a WAN connection, and RSRP corresponding to the base station 114A or 114B and a WAN connection, and RSRQ corresponding to the base station 114A or 114B and a WAN connection, and RSSI corresponding to the base station 114A or 114B and a WAN connection, an SINR corresponding to the base station 114A or 114B and a WAN connection, an SNR corresponding to the base station 114A or 114B and a WAN connection, an SRS corresponding to the base station 114A or 114B and a WAN connection, a quality of state associated with the downlink received by the multi-link device 104 from base station 114A or 114B, or one or more combinations thereof. In some embodiments, the mapping to each of the WAN connections established are based on a ranking of one or more frequency bands provided by each of the base stations 114A and 114B, wherein the ranking is determined based on one or more of the PUCCH, PUSCH, RSRP, RSRQ, RSSI, SINR, SNR, SRS, or one or more combinations thereof. Additionally, the mapping can be based on the type of data (e.g., ultra-reliable audio data, low-latency audio data, mission critical video data, ultra-reliable low-latency video data) to be transmitted by the multi-link device 104.

Example Flowchart

Figure 4:
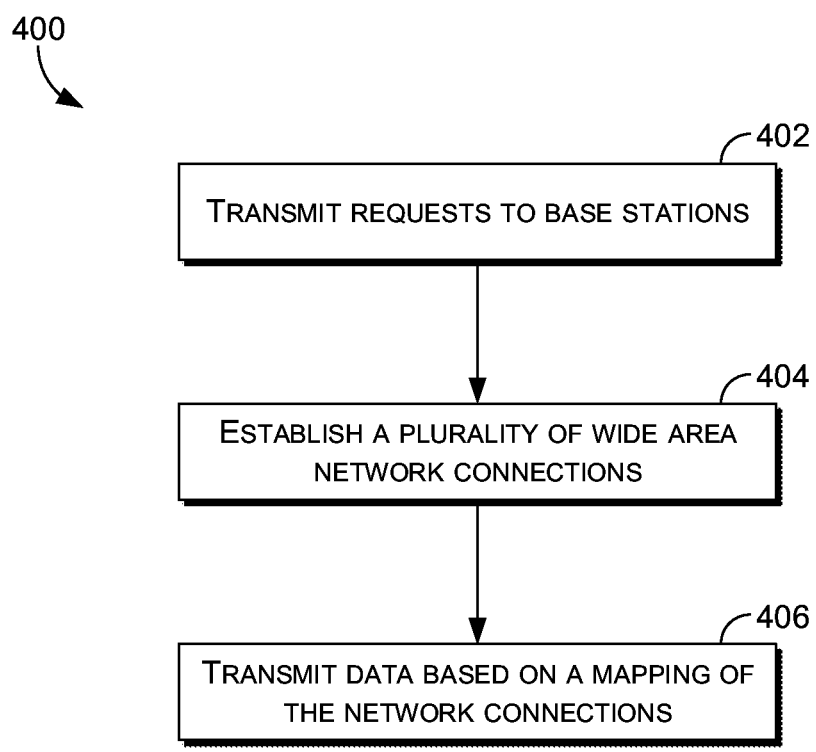
FIG. 4 illustrates an example flowchart for operations by the multi-link device, in accordance with aspects herein.

Having described the example embodiments discussed above, an example flowchart is described below with respect to FIG. 4. Example flowchart 400 includes transmitting one or more requests to one or more base stations at 402. For example, multi-link device may transmit a quality of service request associated with one or more nodes of a base station. In some embodiments, the multi-link device can receive one or more RSSI, one or more SNR, one or more bit error rates, one or more modulation and coding scheme index values, one or more data throughput factors, radiation patterns, another type of bandwidth metric, or one or more combinations thereof, based on the requests. For example, another type of bandwidth metric can include a high frequency band metric, a very high frequency band metric, an ultra-high frequency band metric, an L band metric, an S band metric, a C band metric, an X band metric, a Ku band metric, a Ka band metric, a V band metric, a W band metric, a millimeter wave band metric, or one or more combinations thereof. In some embodiments, the multi-link device can receive a performance rating, an upload speed, a download speed, a latency measurement associated with an orientation and location of the base station or the multi-link device, or one or more combinations thereof, based on the request.

At 404, the multi-link device can establish a plurality of concurrently active wide area network connections with one or more nodes of one or more base stations based on the requests. The multi-link device can have a set of antennas corresponding to each of the plurality of WAN connections. In some embodiments, one portion of the plurality of WAN connections are established with a first base station and another portion of the plurality of WAN connections are established with a second base station. As one non-limiting example, if the multi-link device has established a total of six WAN connections, a first WAN connection can be established with a first node of the first base station and a second WAN connection can be established with a second node of the first base station, and the other four WAN connections can be established with the second base station, for instance. In some embodiments, the multi-link device can determine that a first WAN connection of the plurality of WAN connections has a highest uplink bandwidth of the plurality of WAN connections.

The multi-link device can also establish a plurality of LAN connections with one or more user devices for receiving signals from the one or more user devices. The multi-link device may have a LAN interface capable of establishing a plurality of LAN connections with user devices. For example, the signals can include video data, image data, audio data, location data, other types of data, or one or more combinations thereof. In some embodiments, metadata of the video data, the audio data, and the location data comprise an associated timestamp. In some embodiments, the one or more user devices are located within a predetermined range from a cell edge of the one or more base stations corresponding to the WAN connections. In some embodiments, each of the plurality of user devices are within a threshold distance from at least one of the plurality of user devices.

In embodiments, the multi-link device performs a mapping between each of the plurality of LAN connections and each of the plurality of WAN connections. For example, the mapping between each of the plurality of LAN connections and each of the plurality of WAN connections can be based on a virtual LAN identifier (VLAN ID) assigned to each of the plurality of LAN connections. In some embodiments, each VLAN ID corresponds to a VLAN type (e.g., Wi-Fi, Ethernet). In some embodiments, each VLAN ID is assigned to a frame for each of the plurality of LAN connections. In some embodiments, the mapping is based on an uplink bandwidth of each of the plurality of WAN connections. In some embodiments, the location data from the user devices is mapped to the video data and the audio data based on the associated timestamps. In some embodiments, the mapping is based on the type of data (e.g., audio data, video data) to be transmitted via the WAN connections.

At 406, the multi-link device transmits the signals received from the user devices to the one or more base stations based at least in part on the plurality of WAN connections. For example, the transmission can be based on the mapping of the LAN connections to the WAN connections. The multi-link device, in some embodiments, transmits a first set of data to a first base station of the plurality of base stations and a second set of data to a second base station of the plurality of base stations based on the mapping. For example, the multi-link device can transmit the video data to the first base station and the audio data to the second base station based on the mapping. Continuing this example, in some embodiments, the video and audio data are transmitting simultaneously. In some embodiments, the multi-link device can transmit the location data received from each user device, based on the mapping, to one or more base stations based on the mapping. For example, in some embodiments, the multi-link device transmits the audio data to a first base station via a first WAN connection, the video data to a second base station via a second WAN connection, and the location data to a third base station via a third WAN connection. In some embodiments, the data transmitted via the second WAN connection is based on a second VLAN ID, the data transmitted via the first WAN connection is based on a first VLAN ID, and the data transmitted via the third WAN connection is based on a third VLAN ID. In some embodiments, transmissions to the base stations are based on a ranking of each uplink bandwidth corresponding to the WAN connections.

Example User Device

Having described the example embodiments discussed above of the presently disclosed technology, an example operating environment of an example user device (e.g., user device 102A of FIG. 1) is described below with respect to FIG. 5. User device 500 is but one example of a suitable computing environment, and is not intended to suggest any particular limitation as to the scope of use or functionality of the technology disclosed. Neither should user device 500 be interpreted as having any dependency or requirement relating to any particular component illustrated, or a particular combination of the components illustrated in FIG. 5.

Figure 5:
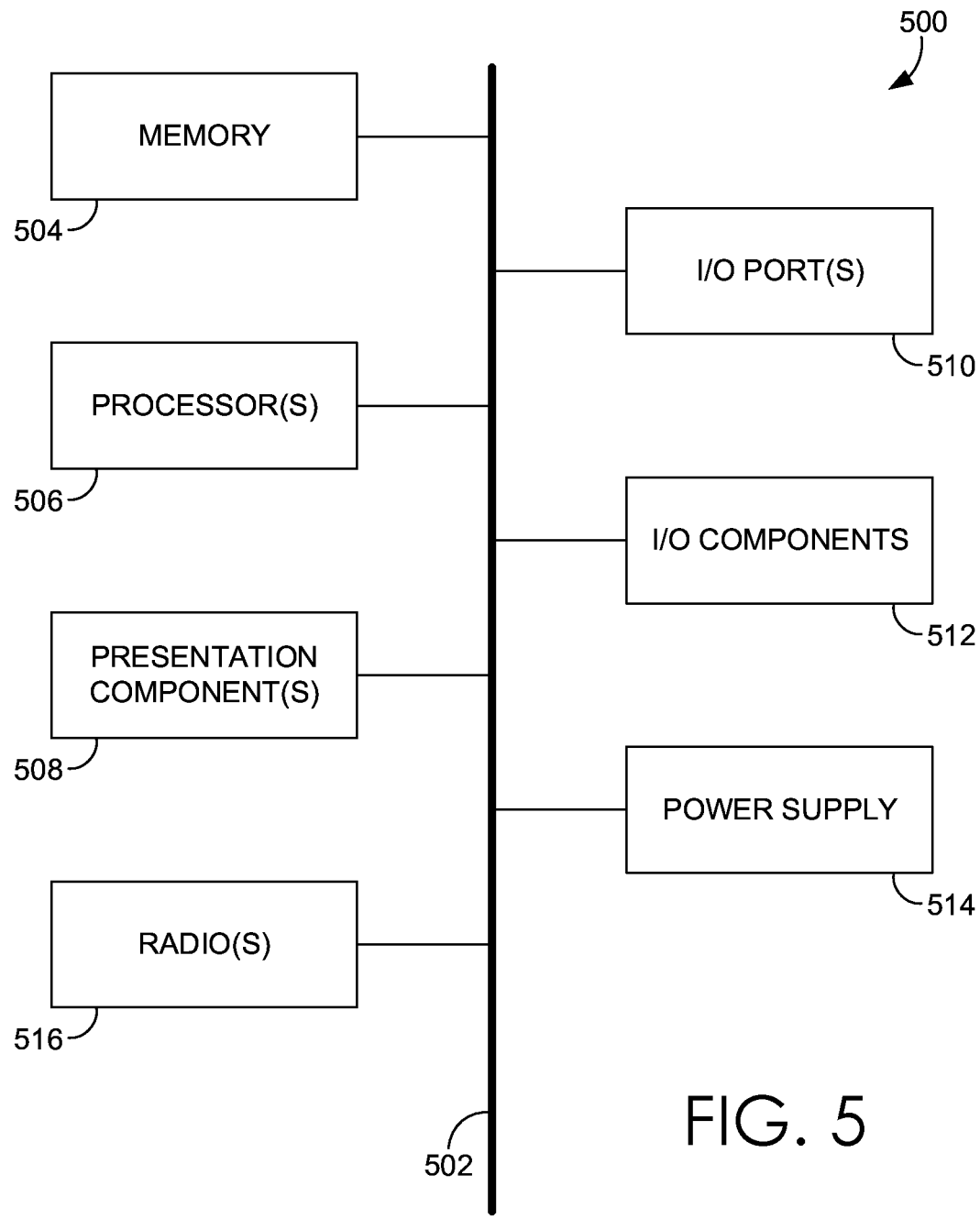
FIG. 5 depicts an example user device suitable for use in implementations of the present disclosure, in accordance with aspects herein.

As illustrated in FIG. 5, example user device 500 includes a bus 502 that directly or indirectly couples the following devices: memory 504, one or more processors 506, one or more presentation components 508, one or more input/output (I/O) ports 510, one or more I/O components 512, a power supply 514, and one or more radios 516.

Bus 502 represents what may be one or more busses (such as an address bus, data bus, or combination thereof). Although the various blocks of FIG. 5 are shown with lines for the sake of clarity, in reality, these blocks represent logical, not necessarily actual, components. For example, one may consider a presentation component, such as a display device, to be an I/O component. Also, processors have memory. Accordingly, FIG. 5 is merely illustrative of an exemplary user device that can be used in connection with one or more embodiments of the technology disclosed herein.

User device 500 can include a variety of computer-readable media. Computer-readable media can be any available media that can be accessed by user device 500 and may include both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by user device 500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. One or more combinations of any of the above should also be included within the scope of computer-readable media.

Memory 504 includes computer storage media in the form of volatile and/or nonvolatile memory. The memory 504 may be removable, non-removable, or a combination thereof. Example hardware devices of memory 504 may include solid-state memory, hard drives, optical-disc drives, other hardware, or one or more combinations thereof. As indicated above, the computer storage media of the memory 504 may include RAM, Dynamic RAM, ROM, EEPROM, flash memory or other memory technology, CD-ROM, a cache memory, DVDs or other optical disk storage, magnetic cassettes, magnetic tape, magnetic disk storage or other magnetic storage devices, a short-term memory unit, a long-term memory unit, any other medium which can be used to store the desired information and which can be accessed by user device 500, or one or more combinations thereof.

The one or more processors 506 of user device 500 can read data from various entities, such as the memory 504 or the I/O component(s) 512. The one or more processors 506 may include, for example, one or more microprocessors, one or more CPUs, a digital signal processor, one or more cores, a host processor, a controller, a chip, a microchip, one or more circuits, a logic unit, an integrated circuit (IC), an application-specific IC (ASIC), any other suitable multi-purpose or specific processor or controller, or one or more combinations thereof. In addition, the one or more processors 506 can execute instructions, for example, of an operating system of the user device 500 or of one or more suitable applications.

The one or more presentation components 508 can present data indications via user device 500, another user device, or a combination thereof. Example presentation components 508 may include a display device, speaker, printing component, vibrating component, another type of presentation component, or one or more combinations thereof. In some embodiments, the one or more presentation components 508 may comprise one or more applications or services on a user device, across a plurality of user devices, or in the cloud. The one or more presentation components 508 can generate user interface features, such as graphics, buttons, sliders, menus, lists, prompts, charts, audio prompts, alerts, vibrations, pop-ups, notification-bar or status-bar items, in-app notifications, other user interface features, or one or more combinations thereof. For example, the one or more presentation components 508 can present a visualization that compares a plurality of inspections of one or more cores of a central processing unit and a visualization of each task of each of the plurality of inspections.

The one or more I/O ports 510 allow user device 500 to be logically coupled to other devices, including the one or more I/O components 512, some of which may be built in. Example I/O components 512 can include a microphone, joystick, game pad, satellite dish, scanner, printer, wireless device, and the like. The one or more I/O components 512 may, for example, provide a natural user interface (NUI) that processes air gestures, voice, or other physiological inputs generated by a user. In some instances, the inputs the user generates may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with the one or more presentation components 508 on the user device 500. In some embodiments, the user device 500 may be equipped with one or more imaging devices, such as one or more depth cameras, one or more stereoscopic cameras, one or more infrared cameras, one or more RGB cameras, another type of imaging device, or one or more combinations thereof, (e.g., for gesture detection and recognition). Additionally, the user device 500 may, additionally or alternatively, be equipped with accelerometers or gyroscopes that enable detection of motion. In some embodiments, the output of the accelerometers or gyroscopes may be provided to the one or more presentation components 508 of the user device 500 to render immersive augmented reality or virtual reality.

The power supply 514 of user device 500 may be implemented as one or more batteries or another power source for providing power to components of the user device 500. In embodiments, the power supply 514 can include an external power supply, such as an AC adapter or a powered docking cradle that supplements or recharges the one or more batteries. In aspects, the external power supply can override one or more batteries or another type of power source located within the user device 500.

Some embodiments of user device 500 may include one or more radios 516 (or similar wireless communication components). The one or more radios 516 can transmit, receive, or both transmit and receive signals for wireless communications. In embodiments, the user device 500 may be a wireless terminal adapted to receive communications and media over various wireless networks. User device 500 may communicate using the one or more radios 516 via one or more wireless protocols, such as code division multiple access ("CDMA"), global system for mobiles ("GSM"), time division multiple access ("TDMA"), another type of wireless protocol, or one or more combinations thereof. In embodiments, the wireless communications may include one or more short-range connections (e.g., a Wi-Fi® connection, a Bluetooth connection, a near-field communication connection), a long-range connection (e.g., CDMA, GPRS, GSM, TDMA, 802.16 protocols), or one or more combinations thereof. In some embodiments, the one or more radios 516 may facilitate communication via radio frequency signals, frames, blocks, transmission streams, packets, messages, data items, data, another type of wireless communication, or one or more combinations thereof. The one or more radios 516 may be capable of transmitting, receiving, or both transmitting and receiving wireless communications via mmWaves, FD-MIMO, massive MIMO, 3G, 4G, 5G, 6G, another type of Generation, 802.11 protocols and techniques, another type of wireless communication, or one or more combinations thereof.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software. For instance, various functions may be carried out by a processor executing instructions stored in memory. As such, other arrangements and elements (for example, machines, interfaces, functions, orders, and groupings of functions, and the like) can be used in addition to, or instead of, those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A multi-link device for wireless communications, the multi-link device comprising:
one or more processors; and
computer memory storing computer-usable instructions that, when executed by the one or more processors, cause the multi-link device to perform operations comprising:
establishing, via the multi-link device, a plurality of local area network (LAN) connections with one or more user devices;
establishing, via the multi-link device, a plurality of wide area network (WAN) connections with one or more base stations based on a mapping between each of the plurality of WAN connections that are concurrently active to the plurality of LAN connections, wherein the multi-link device has a set of antennas corresponding to each of the plurality of WAN connections;
receiving, via the multi-link device, a signal from at least one of the one or more user devices connected with the multi-link device based at least in part on the plurality of LAN connections; and
transmitting, via the multi-link device, the signal to the one or more base stations based at least in part on the plurality of WAN connections,
wherein one portion of the plurality of WAN connections are established with a first base station and another portion of the plurality of WAN connections are established with a second base station, and
wherein the signal includes video and audio data, and wherein the operations further comprise transmitting the video data to the first base station and transmitting the audio data to the second base station based on the mapping.

2. The multi-link device according to claim 1, wherein the one or more user devices are located within a predetermined range from a cell edge of the one or more base stations.

3. The multi-link device according to claim 1, wherein the signal includes location data, and wherein the operations further comprise:
receiving location data from each of a plurality of user devices including the one or more user devices; and
transmitting, based on the mapping, the location data corresponding to the signal and the location data from each of the plurality of user devices to a first base station of the one or more base stations.

4. The multi-link device according to claim 3, wherein the operations further comprise:
receiving video data from each of the plurality of user devices; and
transmitting the received video data to a second base station of the one or more base stations based on the mapping.

5. The multi-link device according to claim 1, wherein the mapping between each of the plurality of LAN connections and each of the plurality of WAN connections is based on a virtual LAN identifier (VLAN ID) assigned to each of the plurality of LAN connections.

6. The multi-link device according to claim 5, wherein the operations further comprise:
receiving video data, audio data, and location data from each of a plurality of user devices including the one or more user devices;
transmitting the video data to a first base station of the one or more base stations via a first WAN connection of the plurality of WAN connections based on a first VLAN ID assigned to one of the plurality of LAN connections;
transmitting the audio data to a second base station of the one or more base stations via a second WAN connection of the plurality of WAN connections based on a second VLAN ID assigned to one of the plurality of LAN connections; and transmitting the location data to a third base station of the one or more base stations via a third WAN connection of the plurality of WAN connections based on a third VLAN ID assigned to one of the plurality of LAN connections.

7. A method for utilizing a multi-link device, the method comprising:

receiving, at the multi-link device, a first set of data from at least one of a plurality of user devices via the multi-link device having a local area network (LAN) interface capable of establishing a plurality of LAN connections with the plurality of user devices;

receiving, at the multi-link device, a second set of data from the at least one of the plurality of user devices via the multi-link device;

establishing, via the multi-link device, a plurality of wide area network (WAN) connections with a plurality of base stations based on a mapping between each of the plurality of LAN connections and each of the plurality of WAN connections, the plurality of WAN connections being concurrently active to the plurality of LAN connections; and transmitting, via the multi-link device, the first set of data to a first base station of the plurality of base stations and the second set of data to a second base station of the plurality of base stations based on the mapping, wherein the first set of data is audio data and the second set of data is video data.

8. The method according to claim 7, wherein each of the plurality of user devices are within a threshold distance from at least one of the plurality of user devices.

9. The method according to claim 7, wherein the mapping is based on a virtual LAN identifier (VLAN ID) assigned to a frame for each of the plurality of LAN connections.

10. The method according to claim 9, wherein each VLAN ID corresponds to a VLAN type.

11. The method according to claim 7, the method further comprising:

receiving a third set of data from the at least one of the plurality of user devices via the multi-link device, wherein the first set of data is video data, the second set of data is audio data, and the third set of data is location data; and transmitting the third set of data to a third base station of the plurality of base stations based on the mapping.

12. One or more non-transitory computer storage media having computer-executable instructions embodied thereon, that when executed by at least one processor, cause the at least one processor of a multi-link device to perform a method comprising:

receiving, via the multi-link device, a first set of data from a user device via a local area network (LAN) interface of the multi-link device, the LAN interface being capable of establishing a plurality of LAN connections for receiving data from the user device;

mapping, via the multi-link device, each of the plurality of LAN connections to one or more of a plurality of wide area network (WAN) connections with one or more base stations, wherein the plurality of WAN connections are concurrently active to the plurality of LAN connections;

determining, via the multi-link device, a first WAN connection of the plurality of WAN connections has a highest uplink bandwidth of the plurality of WAN connections; and based on the mapping and determining the first WAN connection has the highest uplink bandwidth, causing the multi-link device to transmit the first set of data via the first WAN connection, wherein the first set of data is video data, and wherein the method further comprises:

receiving audio data from the user device;

based on the mapping, causing the multi-link device to transmit the audio data to the one or more base stations via a second WAN connection of the plurality of WAN connections, and wherein the multi-link device is caused to transmit the video data to a first base station of the one or more base stations and the audio data to a second base station of the one or more base stations simultaneously.

13. The one or more non-transitory computer storage media of claim 12, wherein the multi-link device is caused to transmit the first set of data, via the first WAN connection, to two base stations of the one or more base stations simultaneously.

14. The one or more non-transitory computer storage media of claim 12, the method further comprising:

receiving location data from the user device; and based on the mapping, causing the multi-link device to transmit the location data to the one or more base stations via a third WAN connection of the plurality of WAN connections.

15. The one or more non-transitory computer storage media of claim 12, the method further comprising:

receiving location data from the user device, wherein metadata of the video data, the audio data, and the location data comprise an associated timestamp;

mapping the location data to the video data and the audio data based on the associated timestamps; and causing the multi-link device to transmit the location data to the one or more base stations based on the mapping of the location data.

* * * * *